(12) United States Patent
Minton, Jr.

(10) Patent No.: US 12,146,590 B2
(45) Date of Patent: Nov. 19, 2024

(54) FLUID FLOW MANAGEMENT CONTROL AND LEAK DETECTION AND CONSERVATION SYSTEM AND VALVE ASSEMBLY

(71) Applicant: Millard M. Minton, Jr., Wilkesboro, NC (US)

(72) Inventor: Millard M. Minton, Jr., Wilkesboro, NC (US)

( * ) Notice: Subject to any disclaimer, the term of this patent is extended or adjusted under 35 U.S.C. 154(b) by 0 days.

(21) Appl. No.: 18/181,902

(22) Filed: Mar. 10, 2023

(65) Prior Publication Data
US 2024/0301957 A1     Sep. 12, 2024

(51) Int. Cl.
*F16K 5/02*     (2006.01)
*F16K 37/00*    (2006.01)

(52) U.S. Cl.
CPC ........ *F16K 5/0242* (2013.01); *F16K 37/0058* (2013.01)

(58) Field of Classification Search
None
See application file for complete search history.

(56) References Cited

U.S. PATENT DOCUMENTS

| | | |
|---|---|---|
| 1,491,077 A | 4/1924 | Beerworth |
| 1,880,177 A | 9/1932 | Kohler et al. |
| 2,253,643 A | 8/1941 | Mueller |
| 2,577,434 A | 12/1951 | Rosenbaum |
| 3,199,835 A * | 8/1965 | Freed .................... F16K 5/0471 251/317 |
| 3,575,379 A | 4/1971 | Hoos |
| 4,051,866 A | 10/1977 | Bake et al. |
| 5,221,473 A | 6/1993 | Burrows |
| 7,597,790 B2 | 10/2009 | Neyer et al. |

(Continued)

FOREIGN PATENT DOCUMENTS

| | | | | |
|---|---|---|---|---|
| CN | 110425297 A | * | 11/2019 | ........... F16K 27/062 |
| EP | 2098646 | | 9/2009 | |

(Continued)

OTHER PUBLICATIONS

International Search Report dated May 3, 2024 from co-pending application PCT/US2024/017987 listing five references, four of which have been previously cited in the present application and will not be cited again, the remaining patent is cited in the appropriate citation location herein.

*Primary Examiner* — Angelisa L. Hicks
(74) *Attorney, Agent, or Firm* — Tuggle Duggins P.A.; Blake P. Hurt; Reinier R. Smit

(57) ABSTRACT

A valve assembly for a fluid flow management control and leak detection and conservation system, the valve assembly is positioned within a valve well and includes a cam block, valve liner, valve body, spring, shaft, and cover. The cam block, valve liner, and valve body each include a plurality of projections for cooperating with each other to allow rotation of the valve body while preventing rotation of the valve liner. The valve body and valve liner each include opposing pairs of openings for opening and closing the valve assembly. The valve assembly when in an open position allows fluid to flow through the openings of the valve body and valve liner and when closed the sidewall of the valve body presses firmly against the sidewall of the valve liner to form a seal therebetween ceasing all fluid flow.

20 Claims, 14 Drawing Sheets

(56) References Cited

U.S. PATENT DOCUMENTS

| | | |
|---|---|---|
| 9,109,721 B1 | 8/2015 | Williams et al. |
| 9,243,387 B2 | 1/2016 | Forte et al. |
| 2006/0027267 A1 | 2/2006 | Fritze |
| 2007/0194150 A1 | 8/2007 | Ericksen et al. |
| 2011/0178644 A1 | 7/2011 | Picton |
| 2011/0198525 A1 | 8/2011 | Yu |
| 2014/0230914 A1 | 8/2014 | Jaynes |
| 2014/0374444 A1 | 12/2014 | Forte et al. |
| 2017/0102152 A1 | 4/2017 | MacDuff et al. |
| 2018/0155903 A1 | 6/2018 | Völk et al. |
| 2018/0230681 A1 | 8/2018 | Poojary et al. |
| 2019/0323919 A1 | 10/2019 | Fung-A Wing et al. |
| 2020/0072661 A1 | 3/2020 | Forster-Knight et al. |
| 2020/0224394 A1 | 7/2020 | Mariano |
| 2020/0393049 A1 | 12/2020 | Minton, Jr. |
| 2021/0055136 A1 * | 2/2021 | Sapija .................. G01D 5/3473 |

FOREIGN PATENT DOCUMENTS

| | | |
|---|---|---|
| FR | 1548290 | 12/1968 |
| GB | 958129 A | 5/1964 |
| JP | 2013-92176 | 5/2013 |
| JP | 2017223299 A * | 12/2017 |
| JP | 2019-75112 | 5/2019 |
| WO | 2012063223 | 5/2012 |

\* cited by examiner

FLUID FLOW MANAGEMENT CONTROL AND LEAK DETECTION AND CONSERVATION SYSTEM AND VALVE ASSEMBLY

FIELD OF THE INVENTION

The disclosure herein pertains to fluid flow management control and leak detection and conservation systems, and particularly pertains to a valve assembly used in connection with fluid flow management control and leak detection and conservation systems.

DESCRIPTION OF THE PRIOR ART AND OBJECTIVES OF THE INVENTION

Fluid flow management control and leak detection and conservation systems generally include a valve assembly that may be used to control the flow of fluid through a plumbing system. When a demand for fluid flow is present, the valve assembly may be positioned open to allow fluid to flow freely through the valve assembly. In situations where no demand for fluid flow is present, the valve assembly may be repositioned closed to restrict fluid flow through the valve assembly. When the valve is closed it creates a fluid-tight, closed system and makes it possible to determine any leaks by monitoring pressure differentials. When fluid flows through the valve assembly, the pressure on either side of the valve assembly is equal. When the fluid does not flow through the valve assembly, the pressures on either side of the valve should be the same absent any leaks, however, if there is a leak on one side it could create a pressure differential that may result in the production of high impact forces and resulting in damage to the components in the system. This pressure differential subjects the valve to a force that makes it more difficult to turn the valve assembly from a closed position to an open position and generally increases the frictional forces on the components of the valve assembly. This pressure differential subjects various components of the valve assembly to a pressure that makes it difficult to turn the valve and for this reason, it is not uncommon for valves to fail during the opening of a closed valve. Furthermore, because certain fluids, such as water for example, are incompressible, when the valve is quickly closed, a shockwave is generated that travels through the system. This shockwave, known as a water hammer, may cause damage to the system unless it is absorbed by something in the system.

Fluid valve assemblies are often configured with components that undergo frequent repetitive motion, such as the rotation of the valve itself. Many valves must not only overcome the pressures of the fluid flow but must also overcome and cope with frictional forces between the valve and the body in which the valve is positioned. Repetitively overcoming these frictional forces may cause the components to wear, degrade, or ultimately fail.

Thus, in view of the problems and disadvantages associated with prior art devices, the present disclosure was conceived and one of its objectives is to provide a valve assembly used in connection with fluid flow control and conservation systems that includes a valve body, a valve liner, a cam block, a spring, and a shaft that may be rotated manually or remotely via a motor assembly.

It is another objective of the present disclosure to provide a valve assembly configured to reduce friction between the components of the valve assembly when changing between a closed position and an open position.

It is still another objective of the present disclosure to provide a valve assembly including a valve body having an upper support structure and a lower support structure, and a shaft positioned through the upper support structure and lower support structure so that rotation of the shaft will cause the valve body to rotate within a valve liner without causing the valve liner to rotate.

It is yet another objective of the present disclosure to provide a valve assembly including a quarter turn valve body having a sidewall that is capable of forming a substantially fluid-tight seal with a sidewall of a valve liner when the valve assembly is positioned closed.

It is a further objective of the present disclosure to provide a valve assembly including a quarter turn valve body that permits fluid flow through the valve body and fluid flow around the exterior of the valve body when the valve assembly is positioned open.

It is still a further objective of the present disclosure to provide a valve assembly having a valve body drop into the bottom of a valve liner when the valve assembly is in the closed position.

It is yet a further objective of the present disclosure to provide a valve assembly having a valve body rest slightly above the bottom of the valve liner when the valve assembly is in the open position.

Various other objectives and advantages of the present disclosure will become apparent to those skilled in the art as a more detailed description is set forth below.

SUMMARY OF THE INVENTION

The aforesaid and other objectives are realized by providing a valve assembly and system used in connection with fluid control and conservation systems. The valve assembly may be positioned in a valve well positioned between an exterior inlet port and an exterior outlet port of a manifold to control the flow of fluid through a series of conduits formed between the exterior inlet and exterior outlet ports. The valve assembly preferably includes a valve body, a valve liner, a cam block, a spring, and a shaft. The cam block is preferably positioned at the bottom of the valve well and defines a plurality of cam projections. The plurality of cam projections preferably define opposingly positioned low cam projection regions and high cam projection regions. The valve liner preferably forms a body defining a truncated conical shape having a sidewall that defines at least two openings in opposing relation. The two openings defined in the valve liner sidewall are configured (i.e., sized, shaped, and otherwise capable) to coincide with a valve well inlet and valve well outlet to allow fluid to flow through the valve well of the manifold. The valve body also preferably defines a truncated conical shape having a sidewall that defines at least two openings in opposing relation. The valve body is preferably configured (i.e., sized, shaped, and otherwise capable) to nestle within the valve liner so that it is capable of rotating and vertically displacing within the valve liner. The valve body also preferably includes an upper support and a lower support extending between the two openings. The shaft is inserted through a spring, a bore in the upper support which the spring rests against and a bore in the lower support of the valve body, and then through an aperture in the bottom of the valve liner, and an aperture in the bottom of the cam block to seat within the manifold. Situated above the upper support of the valve body and beneath a spacer on the shaft is the spring which urges and maintains the valve body towards the bottom of the valve liner. The shaft is rotatable such that rotation of the shaft will cause the valve body to rotate within the valve liner without causing the cam block and valve liner to rotate.

When the preferred valve assembly is positioned within the valve well of the manifold, the cam block and valve liner are unable to rotate or displace in the vertical or horizontal direction. The valve body is positioned within the valve liner and is capable of rotation and vertical displacement. When the valve body is rotated such that the two openings defined in the valve body sidewall, the two openings defined in the valve liner sidewall, and the inlet and outlet ports of the valve well align, fluid is able to freely flow through the valve assembly and manifold. When the valve body is rotated a quarter turn the two openings defined in the valve body sidewall do not align with either the two openings defined in the valve liner sidewall or the inlet and outlet ports of the valve well, the valve body sidewall will form a wedge effect, forcing the valve body sidewall against the sidewall of the valve liner, creating a seal, preferably a fluid-tight seal, that restricts the fluid from freely flowing through the valve assembly and manifold.

DETAILED DESCRIPTION OF THE PREFERRED EMBODIMENT AND OPERATION OF THE INVENTION

Figure 1:
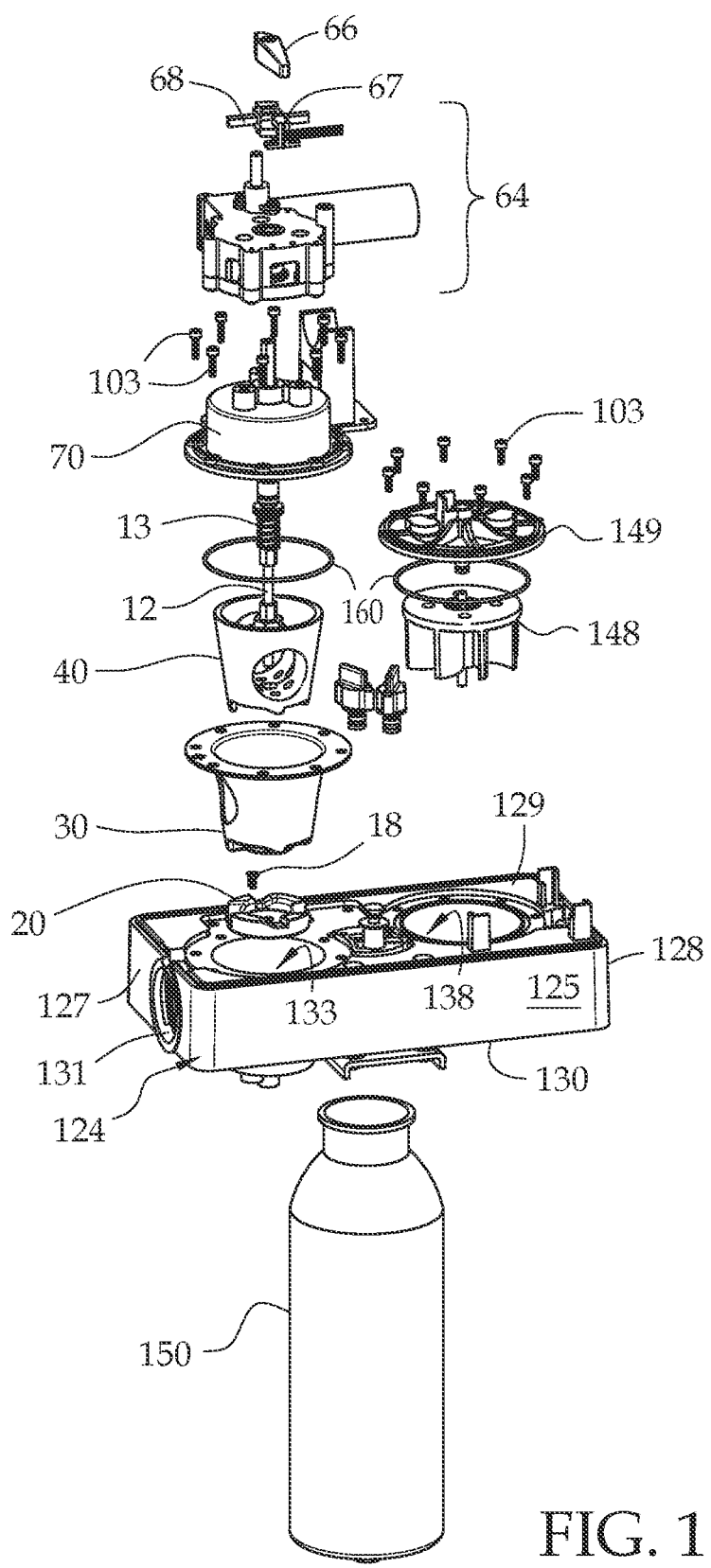
FIG. 1 shows an exploded perspective front view of a preferred embodiment of the fluid flow control and conservation system, showing the valve assembly used to regulate the flow of fluid through the manifold of a fluid flow control and conservation system.

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

Figure 2:
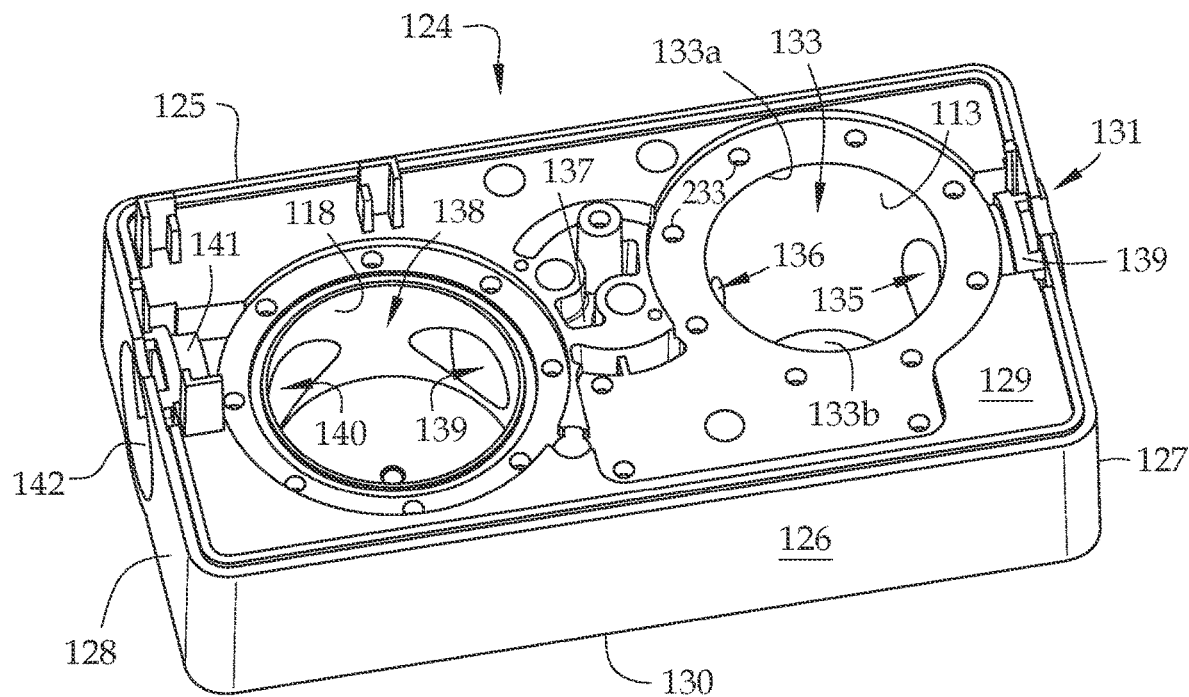
FIG. 2 pictures a top perspective back view of the manifold as removed from the fluid flow control and conservation system.
Figure 3:
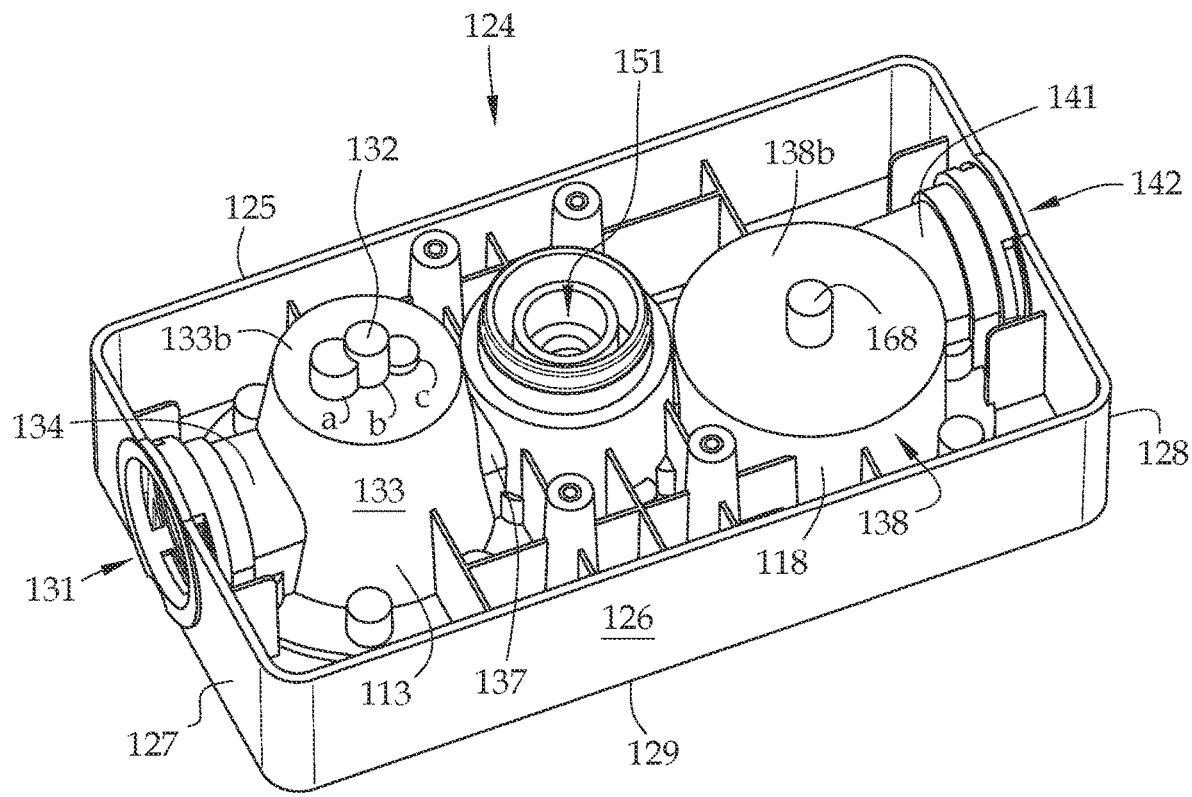
FIG. 3 depicts a bottom perspective view of the manifold as seen in FIG. 2.
Figure 4:
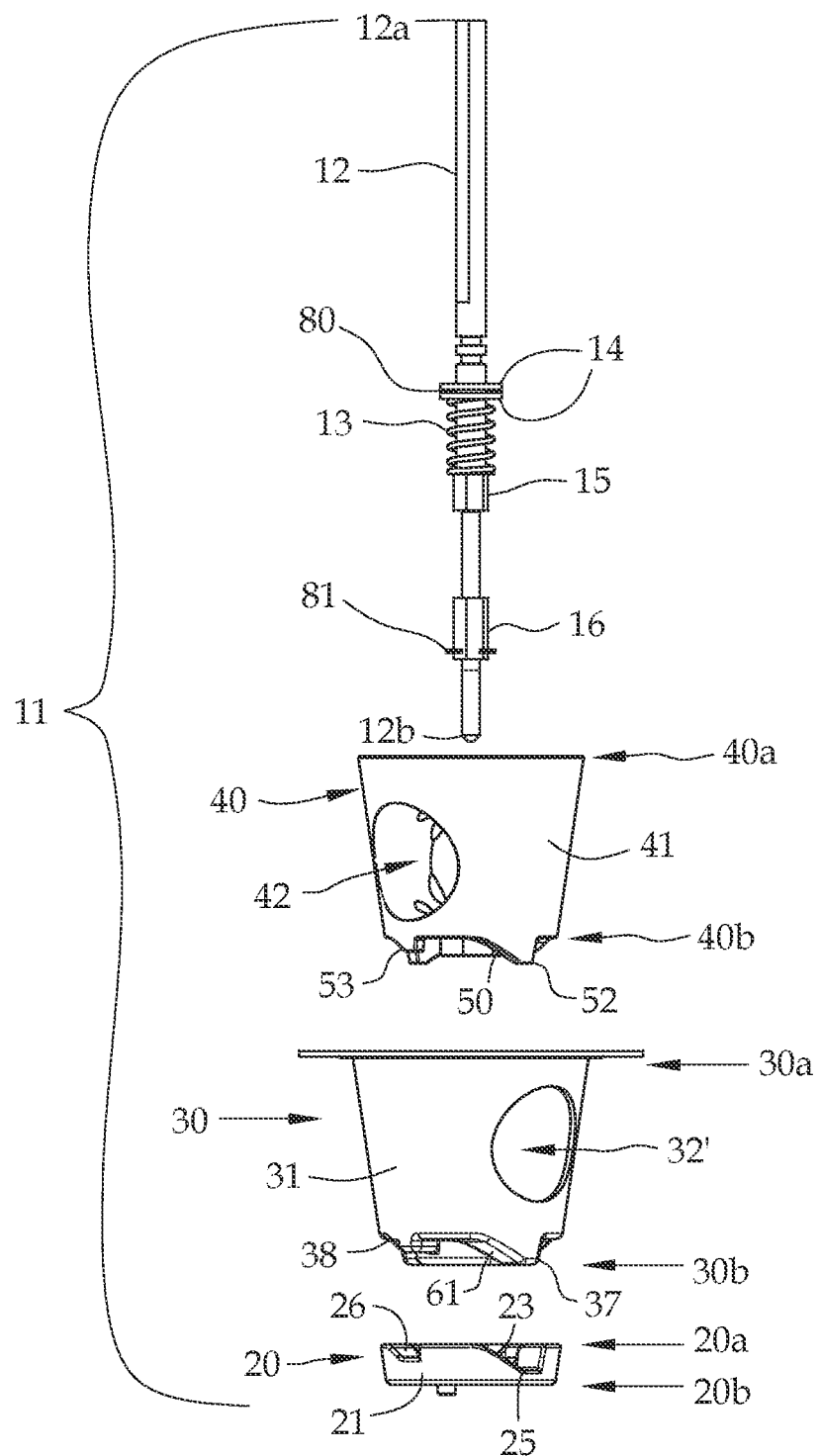
FIG. 4 demonstrates an exploded perspective view of some of the interior components of the valve assembly to be positioned within the valve well of the fluid flow control and conservation system.
Figure 7A:
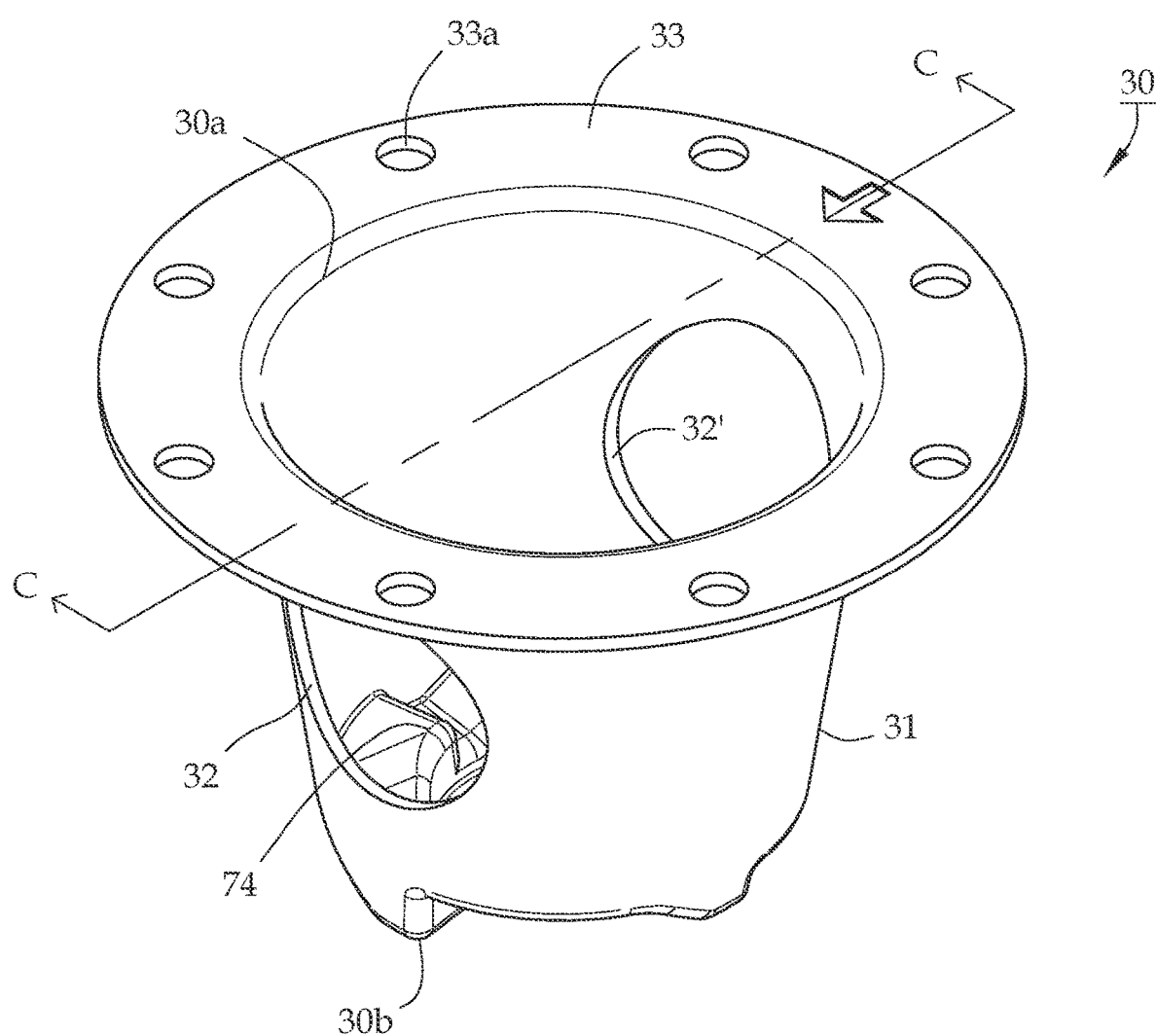
FIG. 7A illustrates a perspective view of the top side of the valve liner.
Figure 7B:
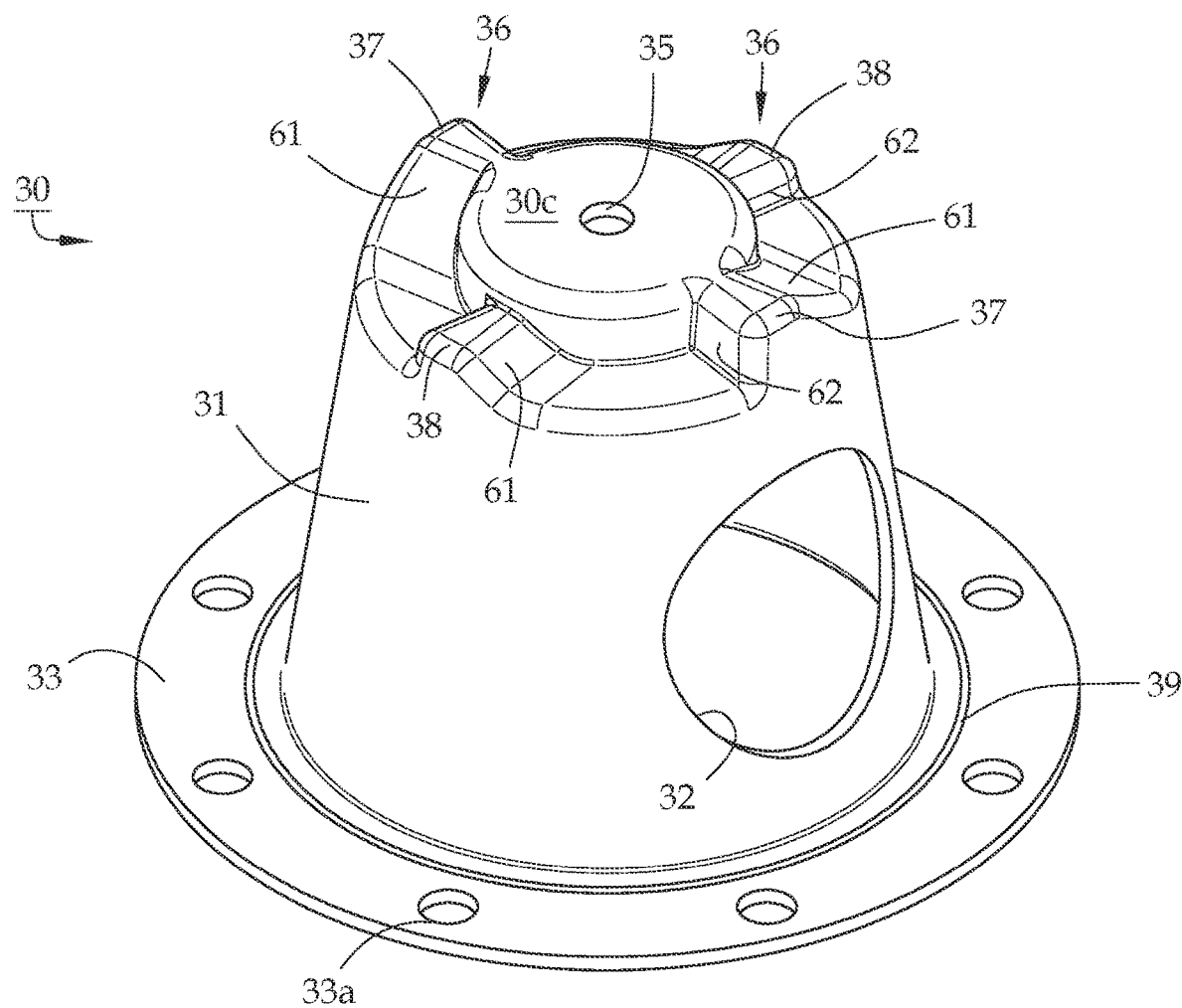
FIG. 7B shows a perspective view of the bottom side of the valve liner.
Figure 7C:
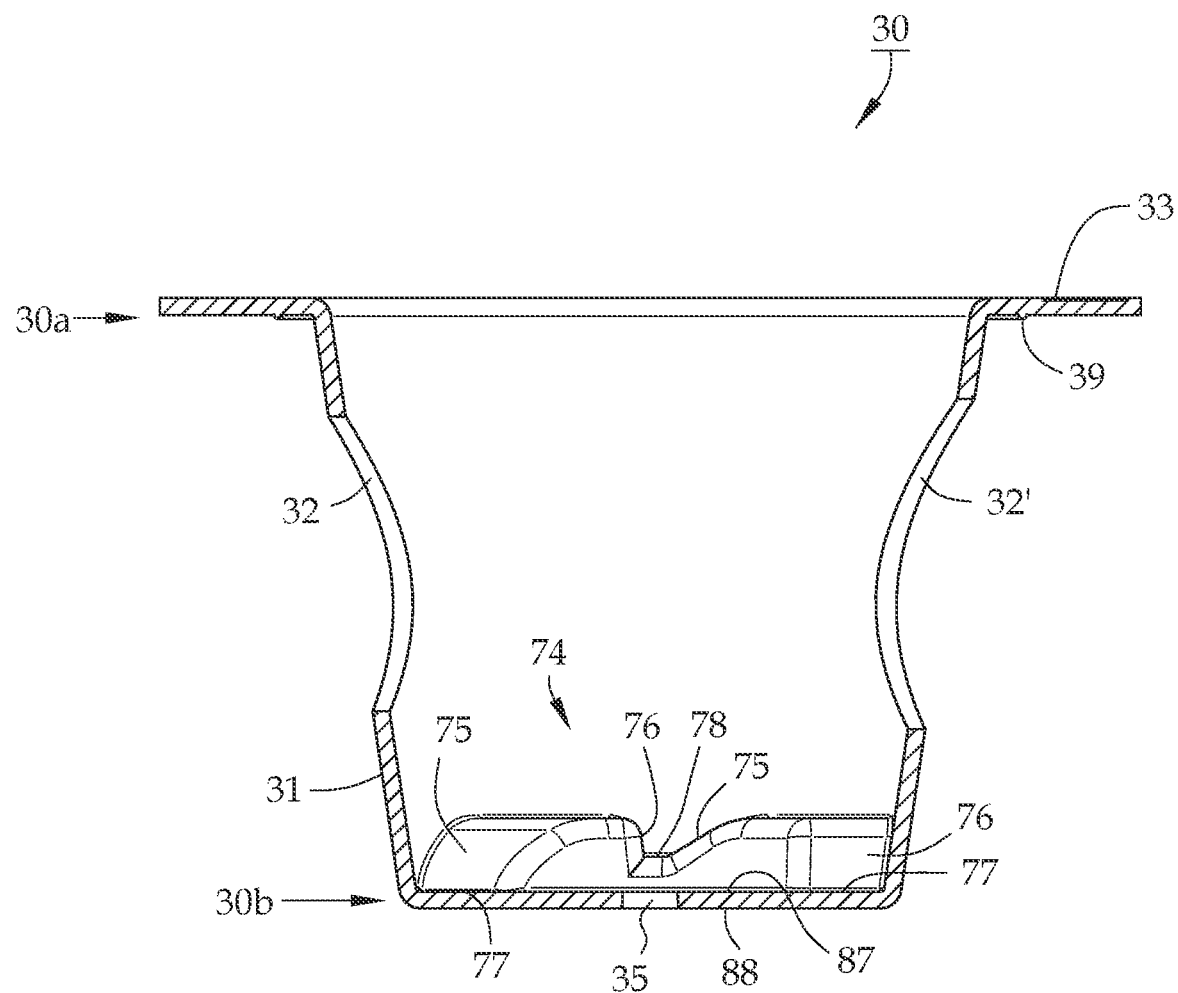
FIG. 7C shows a cross sectional view of the valve liner along lines C-C in FIG. 7A.
Figure 8:
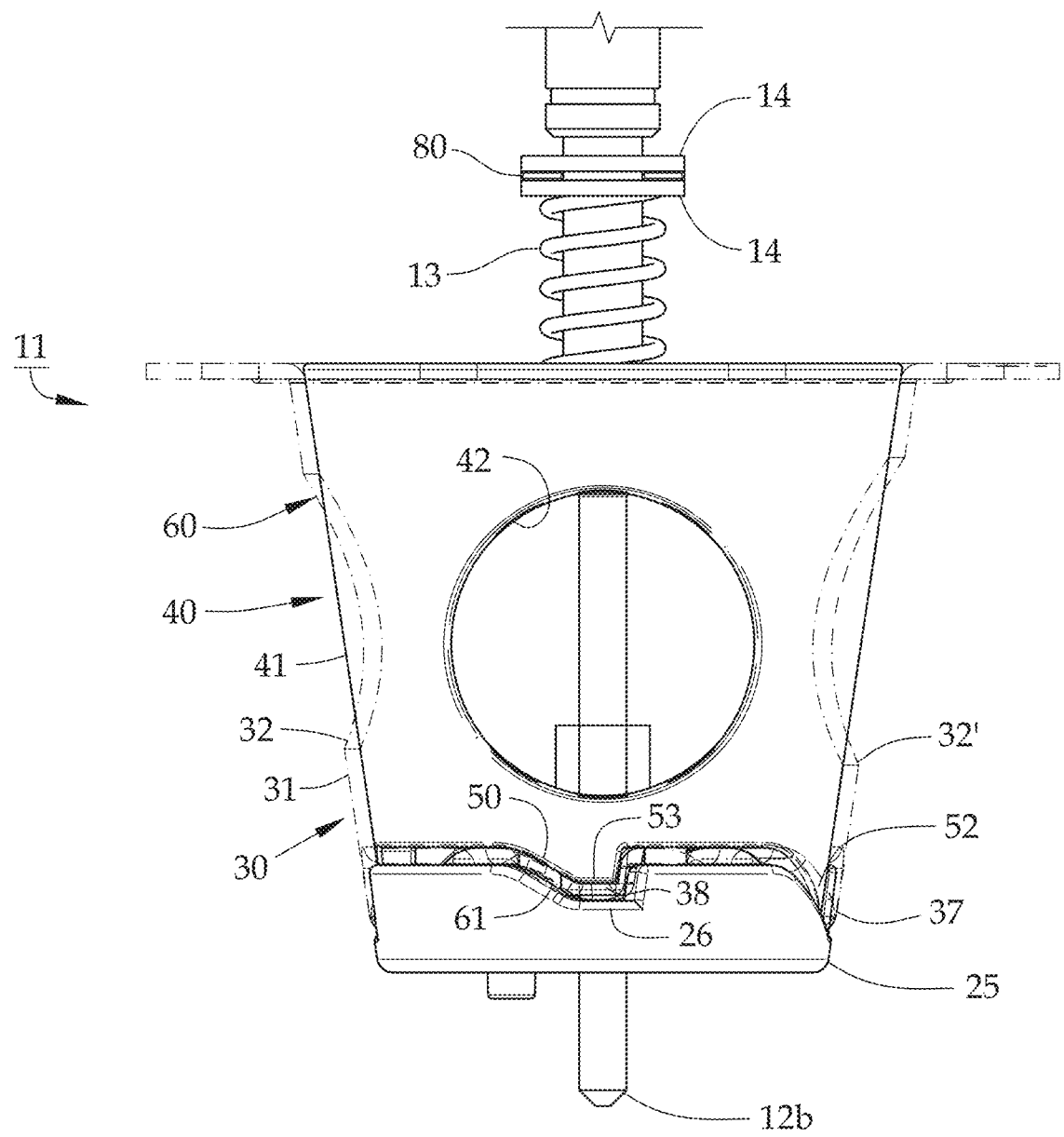
FIG. 8 depicts a front elevational view, partially in phantom, of the valve assembly demonstrating the valve body and valve liner in the closed position.

For a better understanding of the disclosure and its operation, turning now to the drawings, FIGS. 1-9 show various views of valve assembly 11 and respective components of a fluid flow control and conservation system generally designated as 10. FIG. 1 demonstrates an exploded view of the preferred embodiment of valve assembly 11 as part of fluid flow control and conservation system 10. The valve assembly 11 as also seen in FIG. 4 generally includes a cam block 20, a valve liner 30, a valve body 40, a spring 13, a shaft 12, an o-ring 160, and a valve cover 70. The fluid flow control and conservation system 10 is generally responsible for controlling the fluid flow, typically water, (not shown) into a structure, like a home, and is configured to conserve fluid by only allowing fluid flow into the structure when the structure demands fluid. The preferred system shown in FIG. 1 includes a manifold 124 with a valve assembly 11 and flow meter 148 positioned in valve well 133 and flow meter well 138, respectively, formed in the manifold 124. The valve assembly 11 is configured (i.e., sized, shaped, and otherwise capable) to manage the flow of fluid by restricting the flow of fluid through the system 10, namely, by restricting fluid flow through the valve well 133 when the valve body 40 is in the closed position as seen in FIG. 8. The flow meter 148 is positioned and configured to measure and detect various parameters of the fluid flowing through the system 10, the flow meter 148 is preferably positioned downstream from the valve assembly 11 and includes o-ring 160, flow meter cover 149, and hall sensor (not shown).

FIG. 2 pictures a perspective back view of the top side of the manifold 124 of the fluid control and conservation system 10, without the valve assembly 11 and flow meter 148 shown in their respective wells. The manifold 124 preferably includes a valve well 133 configured to receive the valve assembly 11, and a flow meter well 138 configured to receive the flow meter 148. The manifold 124 is generally a box shape having a front wall 125, a rear wall 126, a left wall 127, a right wall 128, a top side 129, and a bottom side 130. The left wall 127 of the manifold 124 defines an exterior inlet port 131 that is configured to be connected to the main fluid supply line, typically a water supply line, (not shown) for a structure. In one or more alternative embodiments (not shown), the exterior inlet port 131 may be configured to facilitate fluid connection with other hardware such as a fluid filtration module or an adapter module used to connect the main fluid supply line. The right wall 128 of the manifold 124 defines an exterior outlet port 142 that is configured to be connected to a fluid supply pipe (not shown) for a structure, or hardware to facilitate the same. The exterior inlet port 131 and the exterior outlet port 142 are in fluid communication through a series of conduits 134, 137, 141 formed in the manifold 124. The fluid valve well 133 and the flow meter well 138 are positioned between the exterior inlet port 131 and the exterior outlet port 142 and are in fluid communication with one another and the exterior inlet port 131 and the exterior outlet port 142 via the series of conduits 134, 137, 141 formed in the manifold 124. Although not illustrated, one or more embodiments of manifold 124 may preferably include additional connectors, adapters, and the like to facilitate a wide range of connectivity via the inlet port 131 and/or the outlet port 142 as may be desirable by a user. In one preferred embodiment, manifold 124 may include a gasket, a fastener, and a connector body, most preferably in either the Presta or Schrader valve style(s).

FIG. 3 depicts a perspective view of the bottom side of the manifold 124 of the fluid control and conservation system 10, without the valve assembly 11 and flow meter 148 shown in their respective valve well 133 and flow meter well 138. The preferred valve well 133 defines an open top end 133a (as shown in FIG. 2) and a closed bottom end 133b (as shown in FIG. 3). The closed bottom end 133b of the valve well 133 is of smaller diameter than the open top end 133a of the valve well 133, forming a truncated conical shaped well having angled sidewall 113. The valve assembly 11, as will be described in further detail below, is configured (i.e., sized, shaped, and otherwise capable) to form a matching truncated conical shape capable of being positioned so as to nest into the valve well 133. The bottom end 133b of the valve well 133 preferably includes one or more downwardly facing protrusions 132 configured to receive a portion of some of the valve assembly components that are positioned within the valve well 133. As would be understood the protrusions 132, 168 on the exterior are formed by the creation of openings within the bottom interior of the respective wells 133, 138 such that the internal openings of one or more downwardly facing protrusions may be configured (sized, shaped, and otherwise capable) to receive, support, or generally hold together the shaft 12 of the valve assembly 11, a threaded fastener 18 and insert 19 for maintaining cam block 20 therein, or a protuberance 29 configured to provide anti-rotational stability for the cam block 20. The preferred flow meter well 138 is positioned downstream from the valve well 133 and is configured to receive an impeller or flow meter 148 therein. The flow meter well 138 defines an open top end 138a (as shown in FIG. 2) and a closed bottom end 138b (as shown in FIG. 3). The closed bottom end 138b of the flow meter well 138 preferably includes one or more downwardly facing protrusions 168 configured to receive a portion of the flow meter 148 to ensure that the flow meter 148 is free to rotate within the flow meter well 138.

Fluid, typically water, flows through the system 10 and preferably enters at the exterior inlet port 131 and exits at the exterior outlet port 142. As the fluid flow (not shown) enters through the exterior inlet port 131 from the fluid supply line (not shown), it travels via a conduit 134 (as shown in FIGS. 2 and 3) until it reaches the valve well 133. The valve well 133 further defines a valve well inlet 135 and an opposingly positioned valve well outlet 136. The fluid will continue to flow downstream through valve well inlet 135, and if the valve assembly 11 is positioned open, through valve assembly 11, to exit through the valve well outlet 136 into a conduit 137 to provide fluid communication between the valve well 133 and the flow meter well 138. In alternative embodiments, the valve well 133 may define more than one valve well inlet 135 or more than one valve well outlet 136 (not shown). The flow meter well 138 defines a flow meter well inlet port 139 and an opposingly positioned flow meter well outlet port 140. Once again, the fluid will continue to flow downstream through conduit 137, the flow meter well inlet port 139, flow meter 148, to exit through the flow meter well outlet port 140 into a conduit 141 configured to provide fluid communication between the flow meter well 138 and the exterior outlet port 142 of the manifold 124. This path may be referred to as the flow path. In alternative embodiments, the flow meter well 138 may define more than one flow meter inlet port 139 or more than one flow meter outlet port 140.

Figure 9:
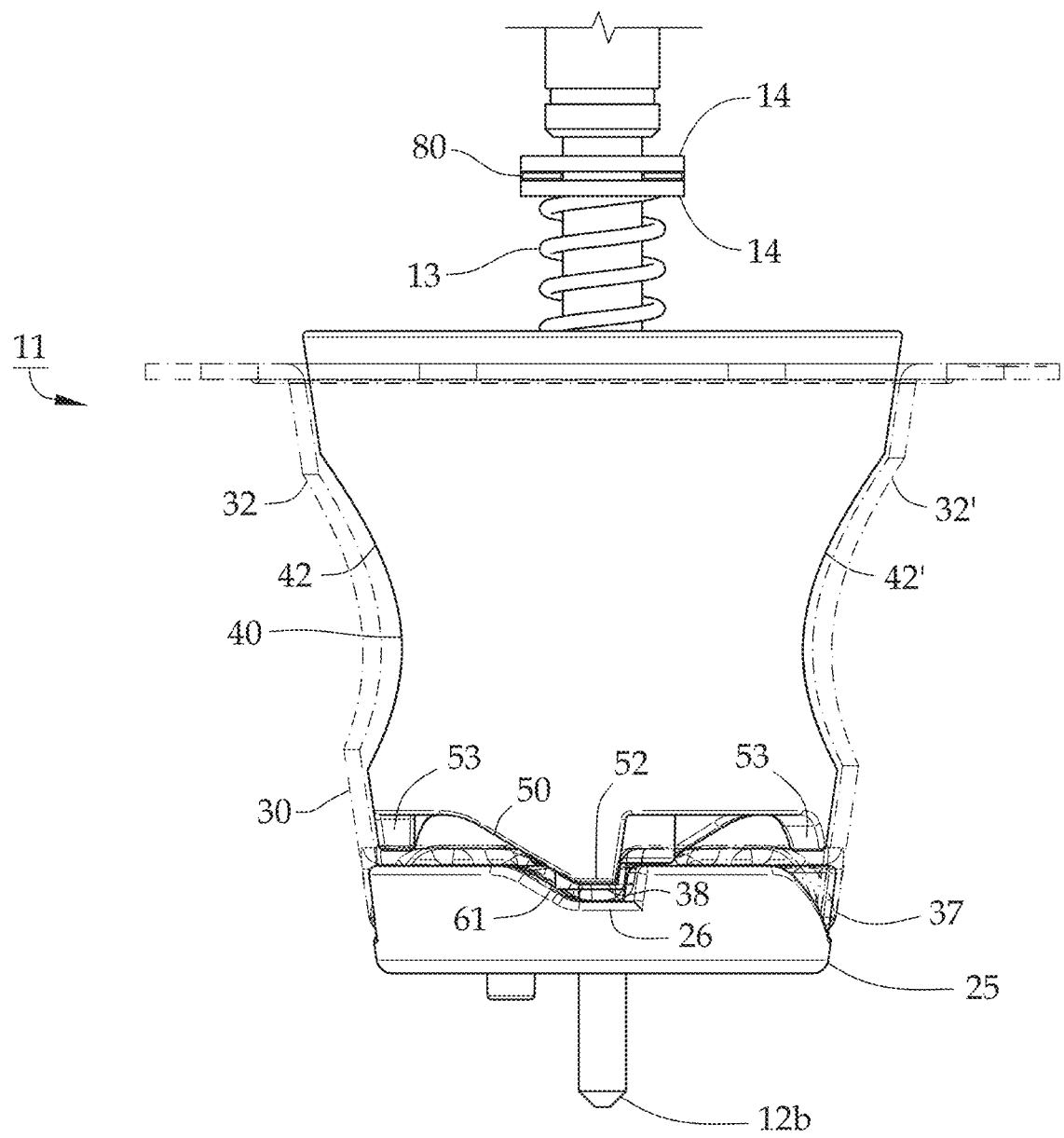
FIG. 9 demonstrates a front elevational view, partially in phantom, of the valve assembly demonstrating the valve body and valve liner in the open position.

In the preferred embodiment, a pressure storage tank 150 may be connected to the conduit 137 facilitating fluid communication between the valve well 133 and the flow meter well 138. This pressure storage tank 150 may be releasably affixed to the bottom side 130 of the manifold 124 with a screwed engagement, a quick connect fitting, a bayonet fitting, a water-tight, frictional engagement, or other similarly known engagements used in the industry. The pressure storage tank 150 is in fluid communication with the conduit 137 facilitating fluid communication between the valve well 133 and the flow meter well 138 via a pressure tank port 151 so as to maintain adequate fluid pressure within the system 10 when the valve assembly 11 is in the open position as seen in FIG. 9 or the closed position as seen in FIG. 8. The pressure storage tank 150 also instantly provides full flow without any reduction of inlet pressure while the valve is reconfigured from the closed position to the open position. The pressure storage tank 150 acts as a water hammer arrestor and is configured to absorb a pressure wave, or water hammer, that is generated when the valve assembly is quickly repositioned from the open position to the closed position.

One or more sensors (not shown) configured to monitor and measure parameters of the fluid flow at various locations along the flow path may be included in the system 10. One or more sensors may monitor and measure parameters such as pressure, flow rate, temperature, fluid level, and positioning of the valve assembly 11 (i.e., whether the assembly is in an open or closed position). The sensors may be located within the system 10 or, in some embodiments, located within the structure demanding fluid (not shown). These sensors generally detect various parameters and transmit this information to a control unit (not shown) installed on the system 10. One or more sensors may be in electrical communication with a power source (not shown) on the system 10 so that it may communicate with the control unit. In the preferred embodiment, as shown in FIG. 1, an optical sensor 67 is installed proximate the valve assembly 11 to measure and detect the orientation of the valve body 40 within the valve assembly 11. The preferred optical sensor 67 is a through beam sensor configured to detect a sensing component 68 affixed to a portion of the valve assembly 11. In the preferred embodiment, the sensing component 68 is affixed to the shaft 12 of the valve assembly 11 and may be configured to rotate with the shaft 12 and valve body 40 so that the optical sensor 67 may detect the rotation and thus the positioning of the valve body 40 within the valve assembly 11. In the preferred embodiment, the flow meter 148 also includes a sensor for measuring and detecting the flow rate of the fluid. In the preferred embodiment, and as would be understood by those of ordinary skill in the art, the flow meter 148 utilizes a hall sensor (not shown). Although a hall sensor is preferred, other sensors may be used to detect and measure the flow rate of the fluid along the flow path, such as but not limited to ultrasonic flow meters, vortex flow meters, orifice flow meters, and the like.

The valve assembly 11 may be actuated (i.e., opened and closed) manually via a handle 66 affixed proximate the top end of the shaft 12. Additionally, or in an alternative embodiment, the valve assembly 11 may also include a motor assembly 64 so that the valve assembly 11 may be actuated (i.e., opened and closed) remotely via a gear assembly (not shown) configured to facilitate the rotation of the shaft 12, which in turn rotates the valve body 40 and sensing component 68 without rotating the valve liner 30 and cam block 20. The motor assembly 64 typically consists of, although not shown, the following components a motor, a motor housing, a gearing assembly, and a control unit electrically connected to the motor configured to provide instructions to drive the gearing assembly. The motor assembly 64 is capable of rotating the shaft 12 of the valve assembly 11. As the shaft 12 rotates, it causes the valve body 40 to rotate within the valve liner 30, thereby moving the valve body 40 between an open position (FIG. 9) and a closed position (FIG. 8).

As shown in FIG. 4, the preferred valve assembly 11 includes the cam block 20, the valve liner 30, the valve body 40, the spring 13, the shaft 12, o-ring 160, and the valve cover 70 (FIG. 1). In the preferred embodiment, the sidewall 113 defining the valve well 133 are of a matching angular configuration to the sidewall 21 of the cam block 20, the sidewall 31 of the valve liner 30, and the sidewall 41 of the valve body 40, resulting in the ability of the valve assembly 11 to nest into the valve well 133. In the preferred embodiment, the cam block 20 is secured to the bottom of the valve well 133 via insert 19 and fastener 18 (FIG. 6A), and the valve liner 30 is then positioned on top of the cam block 20 such that low liner depression regions 37 nest within low cam projection regions 25 as described further below. The cam block 20 and valve liner 30 are configured and arranged so that the cam block 20 and valve liner 30 are unable to rotate within the valve well 133 and are unable to move vertically and horizontally within the valve well 133 when the valve assembly 11 is fully assembled. Once the valve liner 30 is positioned above the cam block 20, the valve body 40 is preferably positioned within the valve liner 30 such that low valve body projection regions 52 nest internally within low liner projection regions 77 of valve liner 30. The valve body 40 is rotatable within the valve liner 30 and is preferably manufactured of the same material as the valve liner 30 to reduce the wear on the valve body 40 and valve liner 30 as the valve body 40 rotates within the valve liner 30. The spring 13 is preferably positioned around the shaft 12 beneath spacer 14 held in place by a top retaining clip 80 and when shaft 12 is inserted into the valve body 40 the spring 13 sits atop upper bore 46 to urge the valve body 40 towards the bottom of the valve liner 30. The top retaining clip 80 is preferably positioned between two spacers 14 to prevent the spring 13 from unintentionally displacing. The top retaining clip 80 prevents the shaft 12 from being pulled out from the valve assembly 11 while being actuated and facilitates a fluid-tight seal to prevent fluid from leaking out of the valve assembly 11. Shaft 12 preferably includes a pair of hexagonal stops 15, 16 which frictionally fit within respectively upper bore 46 and lower bore 47 of valve body 40 for rotation purposes to create a seal between shaft 12 and valve body 40 to prevent any forces from displacing valve body 40 from shaft 12. In the preferred embodiment, as shown in FIG. 4, the bottom hexagonal stop 16 defines a groove configured (i.e., sized, shaped, and otherwise capable) to receive a bottom retaining clip 81. The bottom retaining clip 81 is ideally positioned near the bottom of the shaft 12 between the valve liner 30 and the valve body 40 so that the bottom retaining clip 81 may engage a bottom portion 82 of the valve body 40 (as shown in FIG. 5B) to assist the valve body 40 move from a closed configuration to an open configuration by lifting the valve body 40 and effectively reduce the frictional forces between one or more sloped faces 61 of the valve liner 30 and one or more sloped faces 75 of the valve liner 30. Reducing the frictional forces between the sloped surfaces 61 and 75 reduces the wear and tear on each component and allows the valve body 40 to turn more easily when moving from closed to open. The retaining clips 80, 81 may be used to prevent various components of the assembly 11 from excessive moving by facilitating the rotation of shaft 12 while inhibiting axial movement of various components of the assembly 11. Another purpose of retaining clips 80, 81 is to restrict the loosening of the components of the assembly 11 due to the rapid rotational movement that the assembly 11 may be subjected to. Retaining clips 80 and 81 are preferably three pronged, stamped clips, often referred as circlips, or E-clips and C-clips. In the preferred embodiment, at least one of the retaining clips 80, 81 is expanded to fit around the shaft 12 and then compress to fit snuggly into a groove formed in the shaft 12 to receive at least one retaining clip 80, 81. As will be discussed further below, and shown in FIGS. 8 and 9, the valve body 40 not only rotates within the valve liner 30, but also displaces vertically by valve body projections 49. When the valve assembly 11 is in the open position, the valve body 40 rests slightly above the valve liner 30. When the valve assembly 11 is in the closed position, the valve body 40 rests at the bottom of the valve liner 30 in the lowest possible location.

Figure 5A:
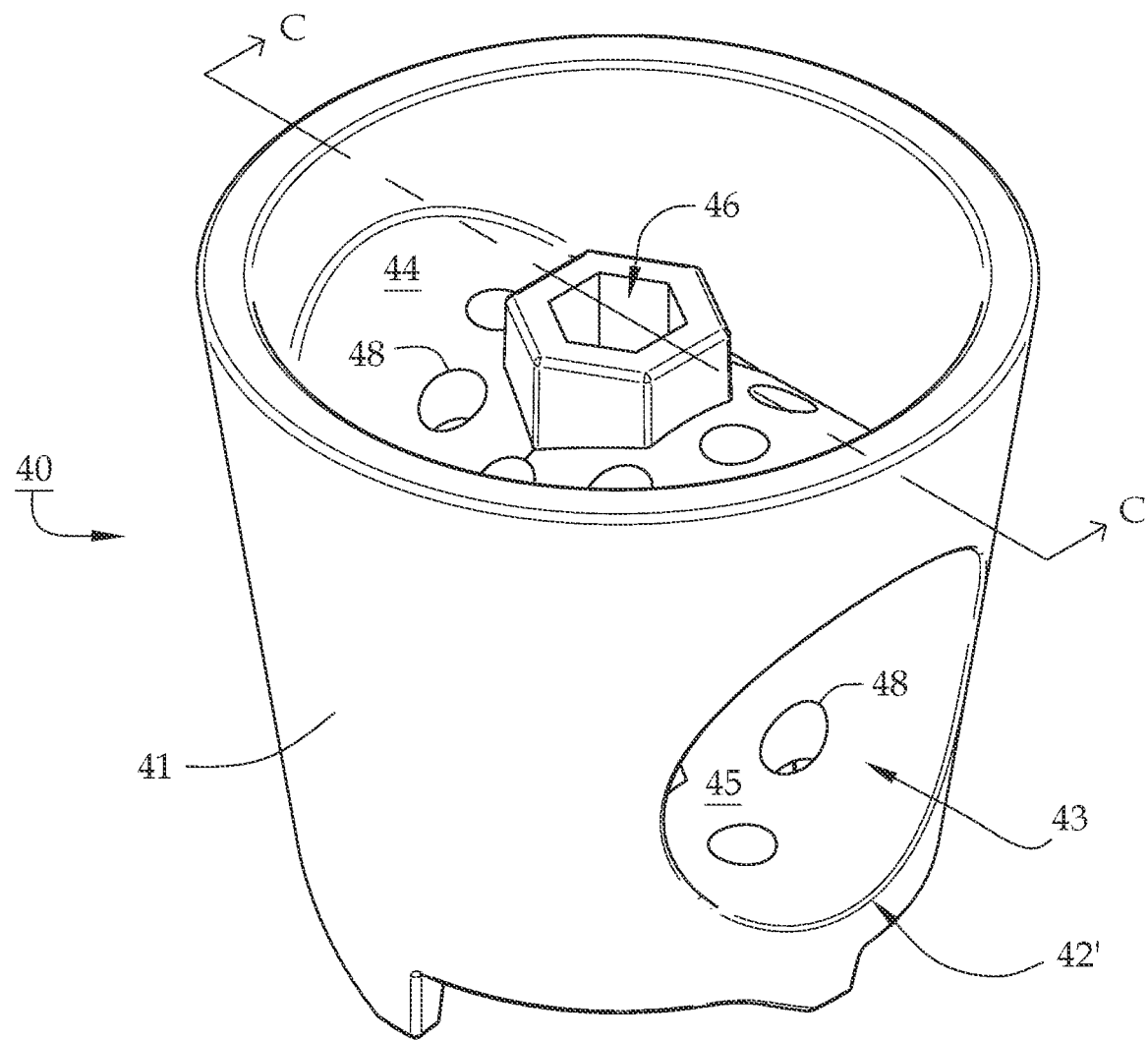
FIG. 5A illustrates a perspective view of the top side of the valve body.
Figure 5B:
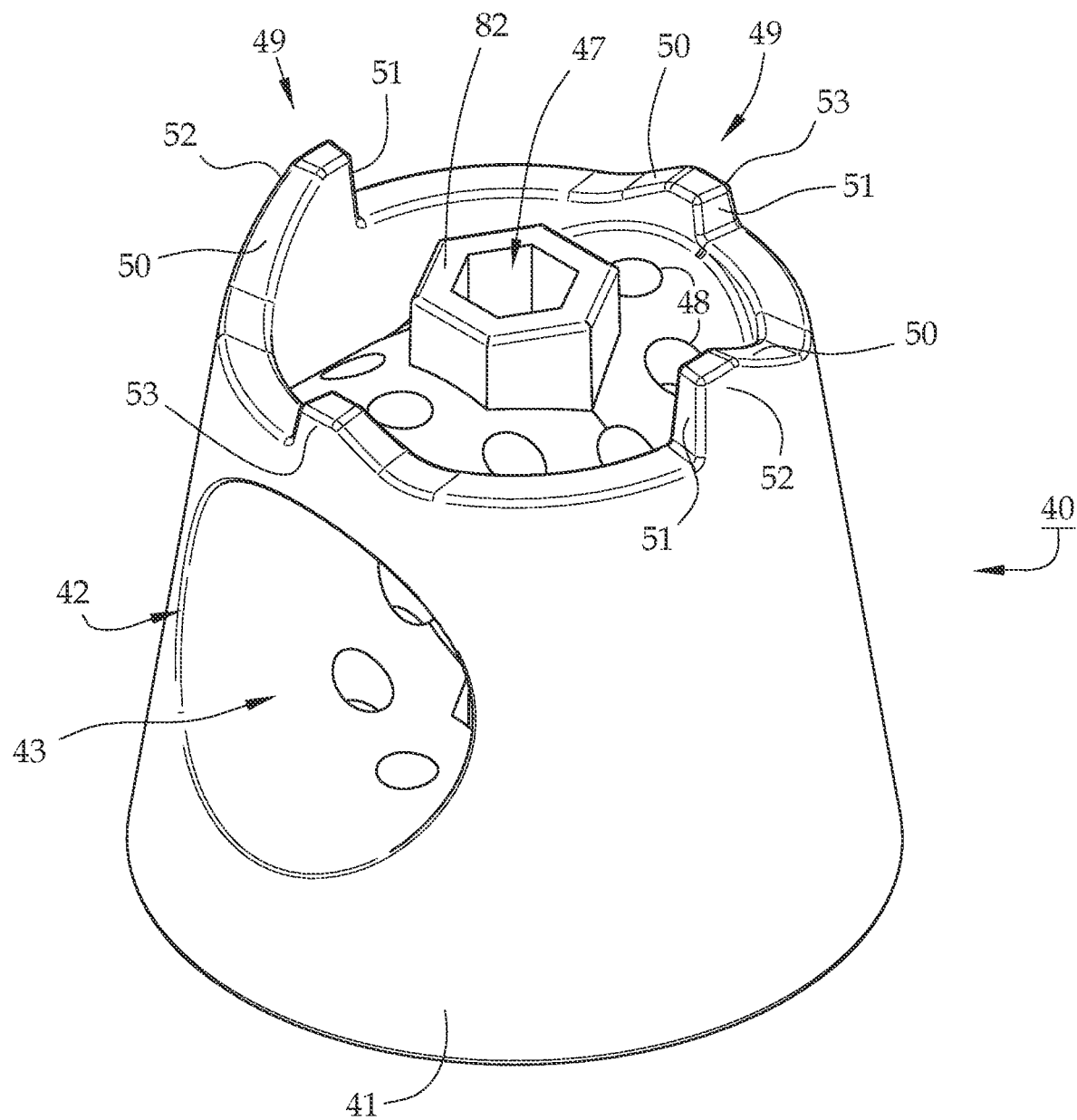
FIG. 5B pictures a perspective view of the bottom side of the valve body.
Figure 5C:
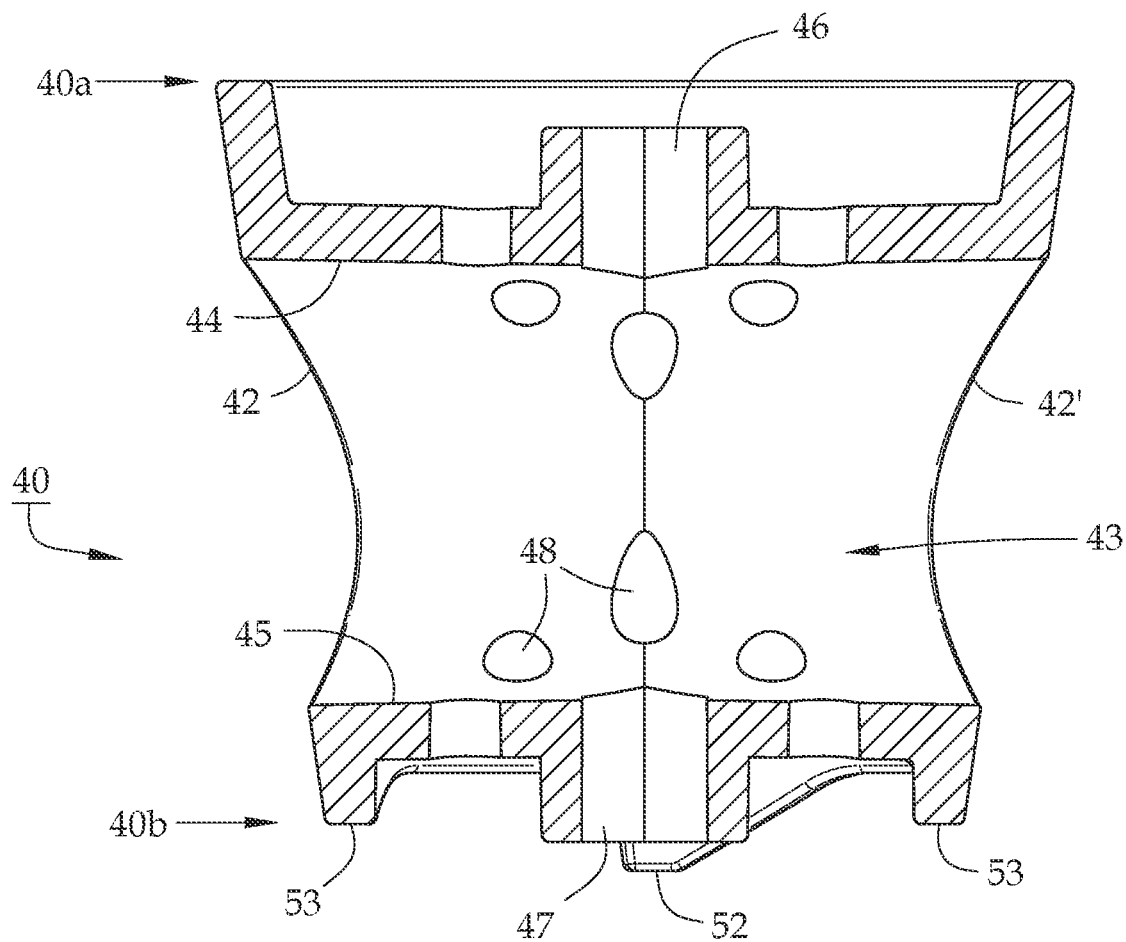
FIG. 5C shows a cross sectional view of the valve body along lines C-C in FIG. 5A.

FIG. 5A illustrates a perspective view of the top side of the valve body 40, FIG. 5B shows a perspective view of the bottom side of the valve body 40, and FIG. 5C depicts a cross-sectional view of the preferred valve body 40 along lines C-C in FIG. 5A. As shown in FIG. 5A, the preferred valve body 40 generally includes a top end 40a and a bottom end 40b with a sidewall 41 extending therebetween as also seen in the side view of FIG. 4. The preferred valve body sidewall 41 is of matching angular configuration to the sidewall 31 of the valve liner 30, which is of matching angular configuration to the sidewall 113 of the valve well 133. The sidewall 41 of the valve body 40 preferably defines two openings 42, 42' that are opposite of one another and are configured (i.e., sized, shaped, and otherwise capable) to align with the valve well inlet 135 and valve well outlet 136 of manifold 124 when oriented in the open position. In alternative embodiments, the valve body 40 may define more than two openings, for example, three openings (not shown). The valve body 40 includes an upper support 44 and a lower support 45 extending between the two openings 42, 42' and forming a channel 43 so that fluid may flow through the valve body 40 when the openings 42, 42' defined in the sidewall 41 are aligned with the openings 32, 32' of the valve liner 30. In alternative embodiments, wherein the valve body 40 defines three openings, the valve liner 30 also defines three openings (not shown). As shown in FIG. 5C, the upper support 44 and lower support 45 preferably define respectively an upper bore 46 and a lower bore 47 through the center of the upper support 44 and lower support 45, respectively. The upper bore 46 and lower bore 47 preferably are configured to align with the shaft aperture 27 of the cam block 20, the aperture 35 through the bottom end 30b of the valve liner 30, and at least one of the protrusions 132, extending below the valve well 133, preferably the central protrusion 132b sized and shaped to receive the bottom end 12b of shaft 12 therein. In the preferred embodiment, the upper bore 46 and lower bore 47 define a hexagon shape, however, in other embodiments the upper bore 46 and lower bore 47 define other polygonal shapes. The upper support 44 and lower support 45 also preferably define a plurality of holes 48 so that fluid flowing through the valve well 133 is capable of surrounding the entire valve body 40 when the valve body 40 is in the open position (FIG. 9). This is particularly advantageous because this configuration permits fluid to flow through the channel 43 formed by the upper support 44 and lower support 45, and also around the exterior of the sidewall 41 of the valve body 40 to prevent the buildup of minerals present in the fluid. The bottom end 40b may include one or more valve body projections 49 which can take various forms, such as lobes, ramps, or teeth, and are designed to interact with raised liner projections 74 formed on the top surface 87 of bottom 30b of the valve liner 30 which consist of low liner projection regions 77 and high liner projection regions 78. As seen in FIG. 5B, the valve body projections 49 of valve body 40 generally have a sloped face 50 and a substantially vertical face 51 (e.g., +/−5 degrees). In the preferred embodiment, the valve body projections 49 of valve body 40 include two low valve body projection regions 52 and two high valve body projection regions 53. In this preferred embodiment, low valve body projection regions 52 and high valve body projection regions 53 alternate in opposing relation around the valve body 40 such that the two low valve body projection regions 52 are located opposite one another with high valve body projection regions 53 formed therebetween likewise in opposing relation. As can be seen in FIGS. 5A, 5B, and 5C, there are cavities or spaces between the respective top end 40a and upper support 44 and bottom end 40b and lower support 45 to permit fluid flow through holes 48 assisting with stabilizing pressure within system 10 during opening and closing of valve assembly 11.

Figure 6A:
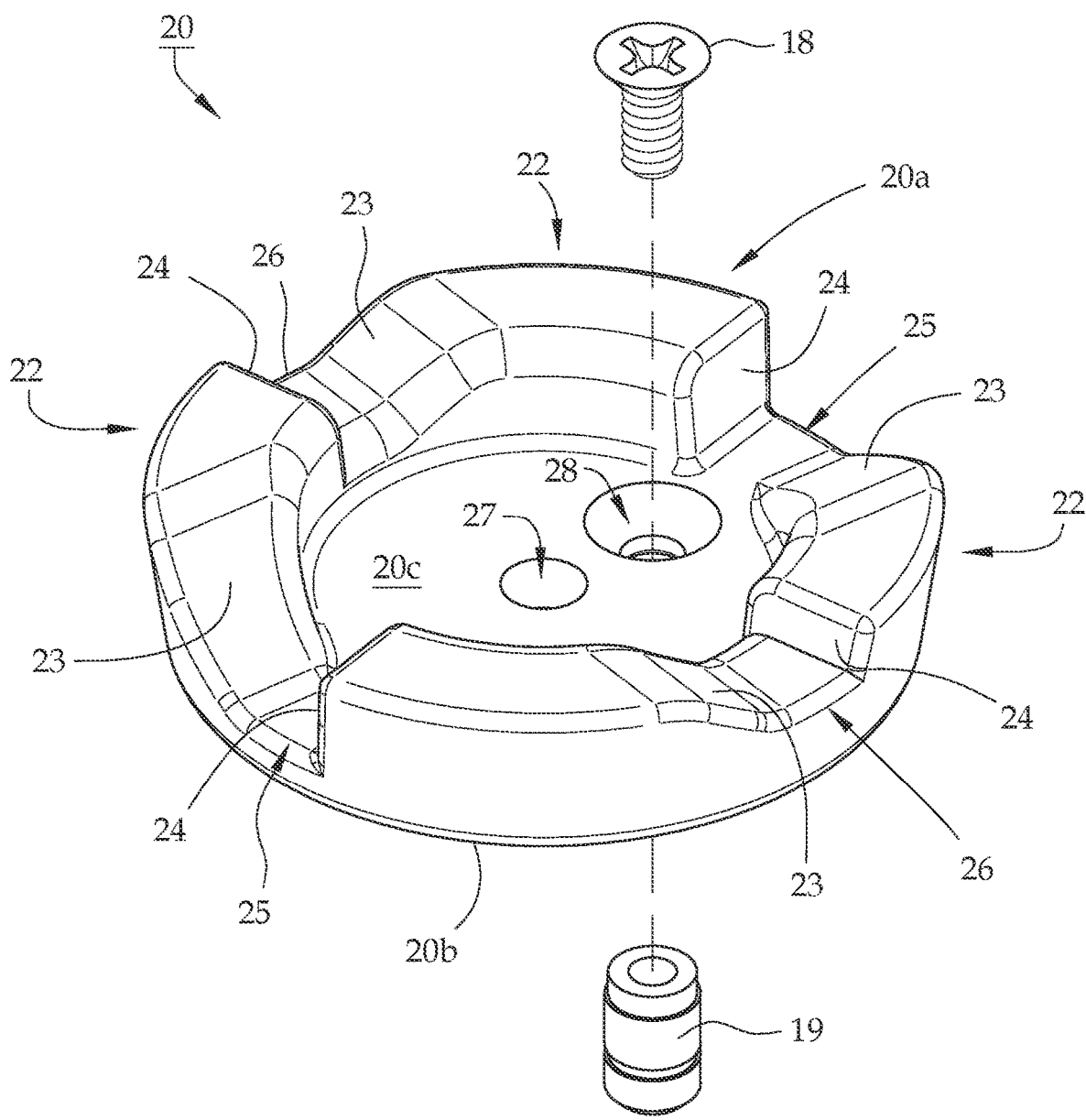
FIG. 6A features a perspective view of the top side of the cam block.
Figure 6B:
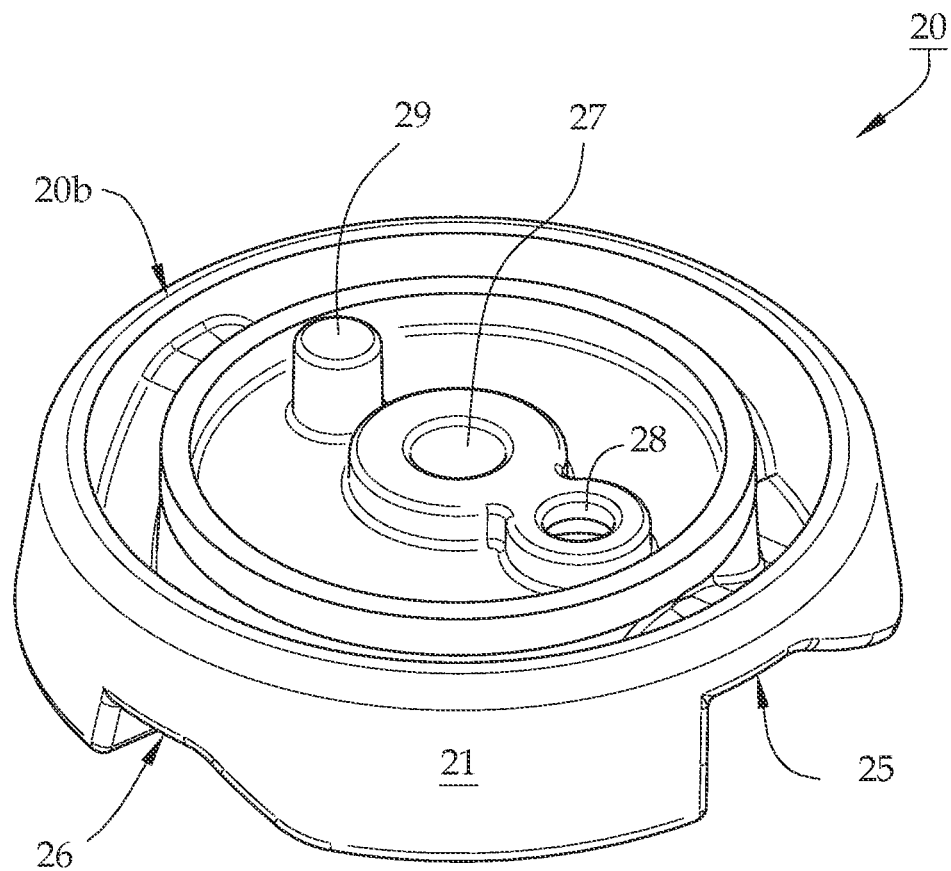
FIG. 6B depicts a perspective view of the bottom side of the cam block.

FIGS. 6A and 6B feature a perspective view of the top side and bottom side of the cam block 20, respectively. The cam block 20 forms a circularly shaped body having a top end 20a and a bottom end 20b with a sidewall 21 extending therebetween as also seen in the side view of FIG. 4. Cam block 20 is configured (i.e., sized, shaped, and otherwise capable) to be positioned at the bottom 133b of the valve well 133 and resist horizontal, vertical, and rotational movement. The top end 20a may include one or more raised cam projections 22 to transmit force or torque from the valve liner 30 to the cam block 20 and prevent the rotational movement of the valve liner 30. The raised cam projections 22 are formed around the outermost edge of top end 20a and can take various forms, such as lobes, ramps, or teeth, and are designed to interact with valve liner depressions 36 formed on the bottom 30b of the valve liner 30. The raised cam projections 22 generally have a sloped face 23 and a substantially vertical face 24 (e.g., +/−5 degrees). In the preferred embodiment, the raised cam projections 22 of cam block 20 include two low cam projection regions 25 and two high cam projection regions 26. In this preferred embodiment, low cam projection regions 25 and high cam projection regions 26 alternate in opposing relation around the cam block 20 such that the two low cam projection regions 25 are located opposite one another with high cam projection regions 26 formed therebetween likewise in opposing relation. The cam block 20 preferably defines a central planar section 20c with two apertures therethrough—a shaft aperture 27 and a fastener aperture 28. In the preferred embodiment, the shaft aperture 27 is a circular shaped aperture defined through the center of the cam block 20 for receiving the shaft therethrough and the fastener aperture 28 is a countersunk aperture offset from the center to receive a threaded fastener to prevent the rotation of the cam block 20 within the valve well 133. The cam block 20 may be secured to the bottom of the valve well 133 using any type of mechanical fastener 18, but it is preferred that the cam block 20 is fastened using a stainless-steel screw 18 with an insert 19 configured to create a secure base for the fastener 18. As can be seen in the bottom view of FIG. 6B, the preferred cam block 20 includes a downwardly extending protuberance 29 offset from the center of the bottom end 20b configured to further prevent the rotation of the cam block 20 as it seats within preferably protrusion 132*c* (FIG. 3) within the valve well 133.

FIGS. 7A and 7B show a perspective view of the top side and bottom side of the valve liner 30, respectively and FIG. 7C depicts a cross-sectional view of valve liner 30. The valve liner 30 is preferably positioned in the valve well 133 and above the cam block 20. The valve liner 30 includes a closed bottom 30*b* and an open top 30*a* with a sidewall 31 extending therebetween as also seen in the side view of FIG. 4. In the preferred embodiment, the sidewall 31 of the valve liner 30 defines two openings 32, 32' that are located on opposite sides of the valve liner 30. These two openings 32, 32' are configured (i.e., sized, shaped, and otherwise capable) to align with the valve well inlet 135 and the valve well outlet 136 when assembled in valve well 133. In the preferred embodiment, valve liner 30 includes a collar 33 extending outwardly, perpendicular from the top edge of the open top 30*a* of valve liner sidewall 31 and defines a plurality of fastener holes 33*a*. When the valve liner 30 is inserted into the valve well 133, the collar 33 will remain outside the valve well 133, and seat within a top side 129 of the manifold 124. The plurality of fastener holes 33*a* defined in the collar 33 are configured to align with an equal plurality of fastener holes 233 defined on the top side 129 of the manifold 124 around the valve well 133. In the preferred embodiment, the collar 33 extending from the top edge of the valve liner 30 and the top side 129 of the manifold 124 define eight fastener holes 33*a*, 233 respectively configured to receive mechanical fasteners 103 (FIG. 1) to restrict the vertical, horizontal, and rotational movement of the valve liner 30 within the valve well 133. The valve liner 30 may also define one aperture 35 through the center of the bottom end 30*b* of the valve liner 30 for receiving shaft 12 therethrough. The valve liner aperture 35 is configured to align with the shaft aperture 27 of the cam block 20 and receive a portion of the shaft 12 when assembled.

As shown in FIG. 7B, the bottom end 30*b* of the valve liner 30 defines a central planar section 30*c* surrounded by one or more liner depressions 36 that are configured (i.e., sized, shaped, and otherwise capable) to coincide and mesh with respectively central planar section 20*c* and the raised cam projections 22 formed on the top end 20*a* of the cam block 20. In the preferred embodiment, the liner depressions 36 on bottom end 30*b* of the valve liner 30 include two low liner depression regions 37 and two high liner depression regions 38, opposingly positioned. In this preferred embodiment, low liner depression regions 37 and high liner depression regions 38 alternate such that the two low liner depression regions 37 are located opposite one another with high liner depression regions 38 formed therebetween likewise in opposing relation. The liner depressions 36 also define a sloped face 61 and a substantially vertical face 62 (e.g., +/−5 degrees) which coincide and mesh with the cam projections 22 to prevent the rotational movement of the valve liner 30. The low liner depression regions 37 are configured to coincide and mesh with the low cam projection regions 25 to restrict the rotational movement of the valve liner 30 and to ensure that any unbalanced pressure caused by the fluid flow does not cause the valve liner 30 to move vertically or horizontally. The liner depressions 36 on the exterior bottom surface 88 (FIG. 7C) of bottom end 30*b* of the valve liner 30 form reciprocal liner projections 74 on the interior top surface 87 (FIG. 7C) of bottom end 30*b* of the valve liner 30 of equal magnitude. In the preferred embodiment, the liner projections 74 on the interior top surface 87 of the bottom end 30*b* of the valve liner 30 include two low liner projection regions 77 and two high liner projection regions 78. These liner projections 74 on the interior top surface 87 of the bottom end 30*b* are configured to coincide and mesh with valve body projections 49 formed on the bottom end 40*b* of the valve body 40.

FIG. 7C illustrates a cross-sectional view of valve liner 30 as along lines C-C in FIG. 7A. As shown in FIG. 7C, the interior top surface 87 of bottom end 30*b* of the valve liner 30 may include a plurality of liner projections 74 configured (i.e., sized, shaped, and otherwise capable) to coincide and mesh with the plurality of valve body projections 49 of valve body 40. The liner projections 74 may include opposingly positioned pairs of low liner projection regions 77 and high liner projection regions 78 having one or more sloped face(s) 75 and one or more vertical face(s) 76. In some embodiments, the liner projections 74 and the liner depressions 36 may be of different magnitude, however, in the preferred embodiment the configuration (i.e., the size, shape, orientation, and positioning) of the plurality of liner projections 74 are such that the plurality of valve body projections 49 coincide and mesh. The collar 33 proximate the top end 30*a* may include a sealing ridge 39 to further seal the top portion of the valve assembly 11 when the valve cover 70 is fastened to the manifold 124 via fasteners 103. In the preferred embodiment, the shaft aperture 35 defines a circular shaped aperture through the center of the bottom end 30*b*.

FIG. 8 depicts a front elevational view, partially in phantom, of the valve assembly 11 in the closed position. When the valve assembly 11 is closed, fluid will cease flowing through the system 10, namely the valve well 133. When the valve assembly 11 is positioned within the valve well 133, the cam block 20 and valve liner 30 are configured and arranged to not move vertically nor horizontally and not rotate. In the preferred embodiment, the two openings 32, 32' formed in the sidewall 31 of the valve liner 30 may be aligned with the valve well inlet 135 and valve well outlet 136 when the valve assembly 11 is configured in both the open and closed position. When the valve assembly 11 moves between the open position (FIG. 9) and the closed position (FIG. 8), via a quarter rotation of the shaft 12, the valve body 40 rotates and displaces vertically (i.e., drops). More specifically, as the preferred valve body 40 is rotated, the sloped faces 75 of the liner projections 74 preferably frictionally engage with and slide along the sloped faces 50 of the valve body projections 49 until the high liner projection regions 78 coincide and mesh with the high valve body projection regions 53, causing the valve body 40 to drop (i.e., move vertically) to the lowest point in the valve liner 30. When the valve assembly 11 is in the closed position, the valve body 40 is oriented with the two solid portions of the sidewall 31 engaging and blocking the two openings 32, 32' in the valve liner 30, creating a seal 60, preferably a fluid-tight seal, restricting fluid flow between the valve well inlet 135 and the valve well outlet 136. Because the sidewall 41 of the valve body 40 is of matching angular configuration to the sidewall 31 of the valve liner 30, as the valve body 40 drops into the valve liner 30, the valve body sidewall 41 will form a wedge effect, forcing the sidewall 41 of the valve body 40 against the sidewall 31 of the valve liner 30 and creating a tight (ideally fluid-tight) seal 60 that closes the two openings 32, 32' in the valve liner sidewall 31. The sidewall 41 of the valve body 40 pressing against the sidewall 31 of the valve liner 30 effectively seals shut the openings 32, 32' of the valve liner 30 and prohibits fluid flow through the inlet 135 of the valve well 133. In the closed position, as shown in FIG. 8, the low liner projection regions 77 coincide and mesh together with the low valve body projection regions 52, and the high liner projection regions 78 coincide and mesh together with the high valve body projection regions 53.

FIG. 9 depicts a front elevational view, partially in phantom, of the valve assembly 11 in the open position. When the valve assembly is open, fluid will flow through the system 10 and into the structure. When the valve assembly 11 is positioned within the valve well 133, the cam block 20 and valve liner 30 are configured and arranged to not move vertically nor horizontally and does not rotate. In the preferred embodiment, the two openings 32, 32' formed in the sidewall 31 of the valve liner 30 may be aligned with the valve well inlet 135 and valve well outlet 136 when the valve assembly 11 is configured in both the open and closed position. More specifically, when the valve assembly 11 is in the open position, the sidewall 41 of the valve body 40 disengages the sidewall 31 of the valve liner 30, breaking the seal 60 to permit fluid flow between the valve well inlet 135 and the valve well outlet 136. The disengagement of the sidewall 31 and sidewall 41 while switching between the open position and closed position reduce the frictional wear on the valve body 40 and valve liner 30. When the valve assembly 11 moves between the open position and the closed position, via a quarter turn rotation of the shaft 12, the valve body 40 rotates and displaces vertically (i.e., rises). More specifically, as the preferred valve body 40 is rotated from a closed position to an open position, the sloped faces 75 of the liner projections 74 preferably frictionally engage with the sloped faces 50 of the valve body projections 49 until the high liner projection regions 78 coincide and mesh with the low valve body projection regions 52, causing the valve body 40 to raise (i.e., move vertically) above the bottom surface 88 of the bottom end 30b of valve liner 30. When the valve assembly 11 is the open position, the valve body 40 is oriented such that the two openings 42, 42' defined in the valve body sidewall 41 align with the two openings 32, 32' in the valve liner 30. In the open position, as shown in FIG. 9, the high valve body projection regions 53 will drop into the low liner projection regions 77, causing the low valve body projection regions 52 to rest above (i.e., in a raised position) the high liner projection regions 78. This relationship causes the valve body 40 to remain (i.e., float) a distance above the bottom surface 88 of valve liner 30. As previously mentioned, the raised position of the valve body 40 in the open position facilitates the fluid flow through the channel 43 formed in the valve body 40, but also around the exterior of the sidewall 41 of the valve body 40 via holes 48 to prevent the buildup of minerals. This prevention of mineral build up increases the reliability of the valve assembly 11.

As would be understood during assembly of system 10 and specifically valve assembly 11 within manifold 124, an insert 19 (FIG. 6A) would be placed within protrusion 132a in bottom 133b of valve well 133, cam block 20 would then be placed within valve well 133 aligning respective fastener aperture 28 with the insert 19 for receiving fastener 18. Next valve liner 30 would be positioned within valve well 133 such that liner depressions 36 align with and nestle within cam projections 22 thereby fixedly aligning openings 32, 32' with valve inlet port 135 and valve outlet port 136 as holes 33a align with holes 233 of manifold 124. Valve body 40 is then positioned within valve liner 30 such that valve body projections 49 align with and nestle against liner projections 74, specifically high valve body projections 53 of valve body 40 mate with high liner projection regions 78 of valve liner 30 and low valve body projection regions 52 of valve body 40 mate with low liner projection regions 77 of valve liner 30 to be in the closed position as seen in FIG. 8. In this closed position openings 42, 42' are not in alignment with openings 32, 32' of valve liner 30 and do not permit fluid flow therethrough as sidewall 41 is blocking the respective openings 32, 32' creating seal 60. The top retaining clip 80 to hold spacer 14, and spring 13 is then positioned on shaft 12 which is then inserted through upper bore 46 and lower bore 47 such that hexagonal stops 15, 16 frictionally fit within respectively upper bore 46 and lower bore 47 of valve body 40. As understood spring 13, during rotation of shaft 12, is compressed between spacers 14 and upper bore 46 as valve body 40 rotates to the open position and decompresses to firmly seat valve body 40 within valve liner 30 as valve body 40 rotates and returns to the closed position. The bottom end 12b of shaft 12 would then be inserted through aperture 35 of valve liner 30, and shaft aperture 27 of cam block 20 to seat within protrusion 132b on bottom 133b of valve well 133. As seen in FIG. 1, an o-ring 160 would be placed over shaft 12 and atop collar 33 before attachment of valve cover 70 by fasteners 103 and further attachment of motor assembly 64, and respective optical sensor 67, sensing component 68, and handle 66 on top end 12a of shaft 12. Although not shown or described, as would be understood additional components, covers or attachments may be part of the completely assembled system 10. Operation of valve assembly 11 consists of quarter turn rotations whether by manual or electrical means to either close or open the path of fluid flow through the respective conduits and openings within system 10 as seen in FIGS. 8 and 9 and discussed herein to provide an enhanced fluid conservation system. In the open position as seen in FIG. 9 openings 42, 42' are in alignment with respective openings 32, 32' of valve liner 30 and although not shown as would be understood openings 42, 42' are also in alignment with valve well inlet 135 and valve well outlet 136 of valve well 133 to permit fluid flow through system 10.

As understood the respective sloped faces 23, 61, 75, and 50 described herein are all preferably formed having the same angle regardless of high or low projection/depression positioning to assist with nesting capabilities of the respective components, namely cam block 20, valve liner 30, and valve body 40, and further assist with the rotational forces of valve body 40 within valve liner 30 with respect to movement of sloped faces 50 along sloped faces 75 during opening and closing of valve assembly 11. As would be further understood and as seen in in the closed position in FIG. 8 the angular alignment of the respective components likewise provides a seal 60 as the valve body 40 seats flush within valve liner 30 preventing further fluid flow when closed. While other angles and or positioning of high or low projections or depressions may be contemplated such are not preferred due to the forces endured by the valve assembly 11 during operation and the preference to reduce pressure within the fluid flow control and conservation system when closing and opening and the valve assembly 11.

The illustrations and examples provided herein are for explanatory purposes and are not intended to limit the scope of the appended claims.

I claim:

1. A fluid flow management control and leak detection and conservation system (10) comprising:
a manifold (124) defining an exterior inlet port (131), an exterior outlet port (142), a plurality of conduits (134, 137, 141) facilitating fluid communication between the exterior inlet port (131) and the exterior outlet port (142), and a valve well (133) positioned between the exterior inlet port (131) and the exterior outlet port (142) and in fluid communication with the plurality of conduits (134, 137, 141), the valve well (133) facilitating fluid communication between the exterior inlet port (131) and the exterior outlet port (142);

a valve assembly (11) positioned within the valve well (133), the valve assembly (11) including a cam block (20), a valve liner (30), a valve body (40), a shaft (12) passing through an upper bore (46) and a lower bore (47) of the valve body (40), and a bottom portion (12b) of the shaft (12) extending beyond the lower bore (47), a spring (13), and valve cover (70); and wherein the cam block (20) and valve liner (30) are positioned within the valve well (133) and do not rotate within the valve well (133) and wherein the shaft (12) is rotatable and causes the valve body (40) to rotate within the valve liner (30) between an open position and a closed position.

2. The system of claim 1, wherein the cam block (20) includes one or more raised cam projections (22) defining a sloped face (23) and a substantially vertical face (24).

3. The system of claim 2, wherein the one or more raised cam projections (22) define at least one low cam projection region (25) and at least one high cam projection region (26).

4. The system of claim 1, wherein a bottom surface (88) of the valve liner (30) includes one or more liner depressions (36) defining a sloped face (61) and a substantially vertical face (62).

5. The system of claim 4, wherein the one or more liner depressions (36) define at least one low liner depression region (37) and at least one high liner depression region (38).

6. The system of claim 1, wherein the valve body (40) includes an upper support (44) and a lower support (45) forming a channel (43) between openings (42, 42') defined in a sidewall (41) of the valve body (40).

7. The system of claim 1, wherein the open position is defined when openings (42, 42') formed in a sidewall (41) of the valve body (40) align a valve well inlet (135) and a valve well outlet (136) and permit fluid flow therethrough.

8. The system of claim 1, wherein the closed position is defined when a sidewall (41) of the valve body (40) aligns with a valve well inlet (135) and a valve well outlet (136) and the sidewall (41) of the valve body (40) presses against a sidewall (31) of the valve liner (30) to form a seal (60) preventing fluid flow through the valve well (133).

9. The system of claim 1, wherein the spring (13) is positioned above the valve body (40) and urges the valve body (40) to drop into the valve liner (30).

10. A valve assembly (11) positioned in a valve well (133) of a fluid flow management control and leak detection and conservation system (10), the valve assembly (11) comprising:

a cam block (20) defining a plurality of cam projections (22) on a top end (20a), the cam projections (22) defining a sloped face (23) and a substantially vertical face (24);

a valve liner (30) defining a plurality of liner depressions (36) on a bottom surface (88) of a bottom end (30b) of the valve liner (30) configured to mesh and coincide with the plurality of cam projections (22), and the plurality of liner depressions (36) forming a plurality of liner projections (74) of equal magnitude on a top surface (87) of the bottom end (30b) of the valve liner (30);

a valve body (40) defining a plurality of valve body projections (49) configured to mesh and coincide with the plurality of liner projections (74);

a shaft (12) positioned through an upper bore (46) and a lower bore (47) of the valve body (40), and a bottom portion (12b) of the shaft (12) extending beyond the lower bore (47) of the valve body (40), the valve liner (30), and the cam block (20) and rotatable, the rotation of the shaft (12) causing the valve body (40) to rotate between an open position and a closed position;

a spring (13) positioned on the shaft (12) and seated above the valve body (40) to urge the valve body (40) down; and a valve cover (70) positioned and secured above the valve well (133).

11. The valve assembly of claim 10, wherein the open position is defined by the alignment of openings (42, 42') defined in a sidewall (41) of the valve body (40) and openings (32, 32') defined in a sidewall (31) of the valve liner (30).

12. The valve assembly of claim 10, wherein the closed position is defined by a sidewall (41) of the valve body (40) pressing against a sidewall (31) of the valve liner (30), the sidewall (41) of the valve body (40) and the sidewall (31) of the valve liner (30) forming a seal (60) to restrict flow of fluid through the valve well (133).

13. The valve assembly of claim 10, wherein the plurality of cam projections (22) further define a low cam projection region (25) and a high cam projection region (26).

14. The valve assembly of claim 10, wherein the plurality of liner projections (74) further define a low liner projection region (77) and a high liner projection region (78).

15. The valve assembly of claim 10, wherein the valve body projections (49) further define a low valve body projection region (52) and a high valve body projection region (53).

16. The valve assembly of claim 10, wherein the valve body (40) includes an upper support (44) and a lower support (45) forming a channel (43) between openings (42, 42') defined in a sidewall (41) of the valve body (40).

17. The valve assembly of claim 16, wherein the upper support (44) defines the upper bore (46), the lower support (45) defines the lower bore (47), and the upper support (44) and the lower support (45) each define a plurality of holes (48) to allow a fluid to flow through the channel (43) and around the valve body (40) when the valve body (40) is in the open position.

18. The valve assembly of claim 10, wherein the valve well (133) includes a well sidewall (113) that defines a truncated conical shape such that a diameter of a bottom (133b) of the valve well (133) is smaller than a diameter of a top (133a) of the valve well (133).

19. The valve assembly of claim 18, wherein a sidewall (31) of the valve liner (30) and a sidewall (41) of the valve body (40) match the truncated conical shape of the well sidewall (113).

20. The valve assembly of claim 10, wherein the valve assembly (11) further includes an optical sensor (67) and a sensing component (68) affixed to the shaft (12), wherein the optical sensor (67) detects a position of the sensing component (68) to determine an orientation of the valve body (40) within the valve liner (30).

* * * * *